(12) United States Patent
Yoon et al.

(10) Patent No.: US 8,896,247 B2
(45) Date of Patent: Nov. 25, 2014

(54) CURRENT SENSOR RECONFIGURATION METHOD OF A VEHICLE HAVING A MOTOR

(75) Inventors: Hyung Jin Yoon, Gyeonggi-do (KR); Jinhyung Lee, Seoul (KR)

(73) Assignee: Hyundai Motor Company, Seoul (KR)

( * ) Notice: Subject to any disclaimer, the term of this patent is extended or adjusted under 35 U.S.C. 154(b) by 218 days.

(21) Appl. No.: 13/562,963

(22) Filed: Jul. 31, 2012

(65) Prior Publication Data

US 2013/0147405 A1  Jun. 13, 2013

(30) Foreign Application Priority Data

Dec. 9, 2011  (KR) .................. 10-2011-0132262

(51) Int. Cl.
*H02P 6/08*  (2006.01)

(52) U.S. Cl.
USPC ............... 318/400.3; 318/139; 318/400.32; 318/430

(58) Field of Classification Search
USPC ............ 318/400.3, 400.32, 15, 139, 430; 388/806; 180/446
See application file for complete search history.

(56) References Cited

U.S. PATENT DOCUMENTS

| | | | | |
|---|---|---|---|---|
| 5,357,181 A | * | 10/1994 | Mutoh et al. | 318/139 |
| 5,407,027 A | * | 4/1995 | Suzuki et al. | 187/277 |
| 5,927,430 A | * | 7/1999 | Mukai et al. | 180/446 |
| 5,992,557 A | * | 11/1999 | Nakamura et al. | 180/446 |
| 6,112,846 A | * | 9/2000 | Mukai et al. | 180/446 |
| 6,154,087 A | * | 11/2000 | Ito | 327/512 |
| 6,445,171 B2 | * | 9/2002 | Sandquist et al. | 324/117 R |
| 6,566,856 B2 | * | 5/2003 | Sandquist et al. | 324/117 R |
| 2002/0149355 A1 | * | 10/2002 | Sandquist et al. | 324/117 H |
| 2003/0039473 A1 | * | 2/2003 | Zhang et al. | 388/806 |
| 2003/0102884 A1 | * | 6/2003 | Sato et al. | 324/772 |
| 2004/0129490 A1 | * | 7/2004 | Kodama et al. | 180/402 |
| 2008/0045377 A1 | * | 2/2008 | Kaya | 477/43 |
| 2008/0111506 A1 | * | 5/2008 | Muta et al. | 318/15 |
| 2008/0300744 A1 | * | 12/2008 | Katsuta et al. | 701/22 |
| 2009/0008168 A1 | * | 1/2009 | Yamanaka et al. | 180/65.4 |
| 2009/0101428 A1 | * | 4/2009 | Itoh | 180/197 |
| 2009/0125172 A1 | * | 5/2009 | Matsubara | 701/22 |
| 2009/0134835 A1 | * | 5/2009 | Welchko et al. | 318/801 |
| 2009/0309528 A1 | * | 12/2009 | Hanada et al. | 318/400.32 |
| 2010/0318249 A1 | * | 12/2010 | Jinno et al. | 701/22 |
| 2011/0169438 A1 | * | 7/2011 | Hasan et al. | 318/400.32 |

FOREIGN PATENT DOCUMENTS

JP  2007-159348 A  6/2007
KR  1020100113247 A  10/2010

* cited by examiner

*Primary Examiner* — Paul Ip
(74) *Attorney, Agent, or Firm* — Edwards Wildman Palmer LLP; Peter F. Corless

(57) ABSTRACT

Disclosed is a method for setting a current sensor of a vehicle having a drive motor according to an exemplary embodiment of the present invention may include confirming a first condition that a vehicle stops its movement, confirming a second condition that a required torque of a drive motor of a vehicle is 0, stopping a current that is supplied to the drive motor if the first condition and the second condition are satisfied, and compensating offset of the current sensor of a drive motor control unit controlling the drive motor. The offset may be compensated if the first condition and the second condition are satisfied for a predetermined time. Accordingly, an offset of the current sensor is compensated in a predetermined driving condition that the vehicle stops moving and therefore the creep surge and the motor torque ripple that can be generated in the vehicle are prevented.

4 Claims, 2 Drawing Sheets

CURRENT SENSOR RECONFIGURATION METHOD OF A VEHICLE HAVING A MOTOR

CROSS-REFERENCE TO RELATED APPLICATION

This application claims priority to and the benefit of Korean Patent Application No. 10-2011-0132262 filed in the Korean Intellectual Property Office on Dec. 9, 2011, the entire contents of which are incorporated herein by reference.

BACKGROUND OF THE INVENTION (a) Field of the Invention

The present invention relates to a method for setting a current sensor of a vehicle having a drive motor that accurately controls the drive motor in a specific condition, particularly by re-setting an offset of the current sensor.

(b) Description of the Related Art

Generally, a three phase current sensor is disposed inside a drive motor control unit (MCU), wherein an offset of the current sensor is varied according to a temperature thereof.

As the temperature rises, the current of the drive motor becomes high in a low speed state. If this condition is continued for a predetermined time, the output value of the three phase current sensor become inaccurate.

Accordingly, a drive motor torque ripple phenomenon is generated in which the output torque of the drive motor is varied, and a creep surge condition is generated.

Methods for effectively compensating the offset of the current sensor have been researched so as to prevent in advance the torque ripple phenomenon and the creep surge condition. However, to date, these methods have been insufficient.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a method for setting a current sensor of a vehicle having a drive motor having advantages of compensating an offset of a current sensor. In particular, the present method is capable of compensating an offset of a current sensor so as to prevent a torque ripple phenomenon and a creep surge condition.

A method for setting a current sensor of a vehicle having a drive motor according to an exemplary embodiment of the present invention may include confirming a first condition in which the vehicle stops moving, confirming a second condition in which a required torque of a drive motor of the vehicle is 0, stopping supply of a current to the drive motor if the first condition and the second condition are satisfied, and compensating offset of the current sensor of a drive motor control unit which controls the drive motor.

According to various embodiments, the offset may be compensated if the first condition and the second condition are satisfied for a predetermined time.

According to various embodiments, in stopping the supply of current to the drive motor, a vehicle control portion (VCU) may generate a drive motor power off instruction, and the drive motor control unit turns off an insulated gate bipolar transistor (IGBT).

According to various embodiments, the current sensor may be a three phase type of current sensor.

The present invention for achieving the above objects regularly compensates an offset of the current sensor in a predetermined driving condition in which the vehicle stops moving and, therefore, the creep surge and the motor torque ripple that would otherwise be generated in the vehicle are prevented.

Other aspects and exemplary embodiments of the invention are discussed infra.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

DESCRIPTION OF SYMBOLS

100: motor control unit
110: drive motor
120: current sensor
130: vehicle control unit

DETAILED DESCRIPTION OF THE EMBODIMENTS

An exemplary embodiment of the present invention will hereinafter be described in detail with reference to the accompanying drawings. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Figure 1:
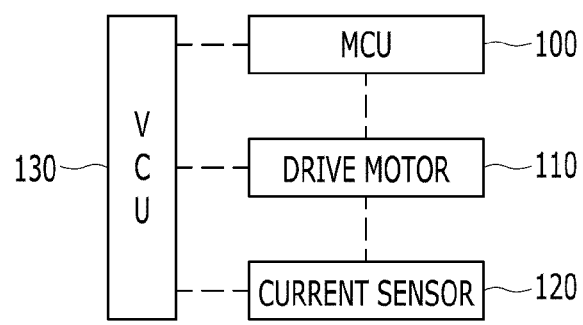
FIG. 1 is a schematic diagram of a vehicle having a drive motor according to an exemplary embodiment of the present invention.

FIG. 1 is a schematic diagram of a vehicle having a drive motor according to an exemplary embodiment of the present invention.

Referring to FIG. 1, a vehicle having a drive motor includes a vehicle control unit 130, a motor control unit 100, a drive motor 110, and a current sensor 120. In the exemplary embodiment of the present invention, the vehicle can be a hybrid vehicle, an electric vehicle, or a fuel cell vehicle.

Generally, the current sensor 120 is applied to a battery management system (BMS) and the motor control unit (MCU) 100 when the offset of the current sensor 120 is compensated. Typically, the offset is compensated once before the current is applied to the drive motor 110 in an on state of the vehicle.

Because the offset is compensated once in an on state as described, the compensation cannot be performed while traveling. Accordingly, creep surge and motor torque ripple are generated by the variation of the offset.

However, according to an exemplary embodiment of the present invention, the offset of the current sensor 120 is compensated more frequently in a predetermined driving condition when the vehicle stops moving. As a result, creep surge and the motor torque ripple of the vehicle are prevented.

Figure 2:
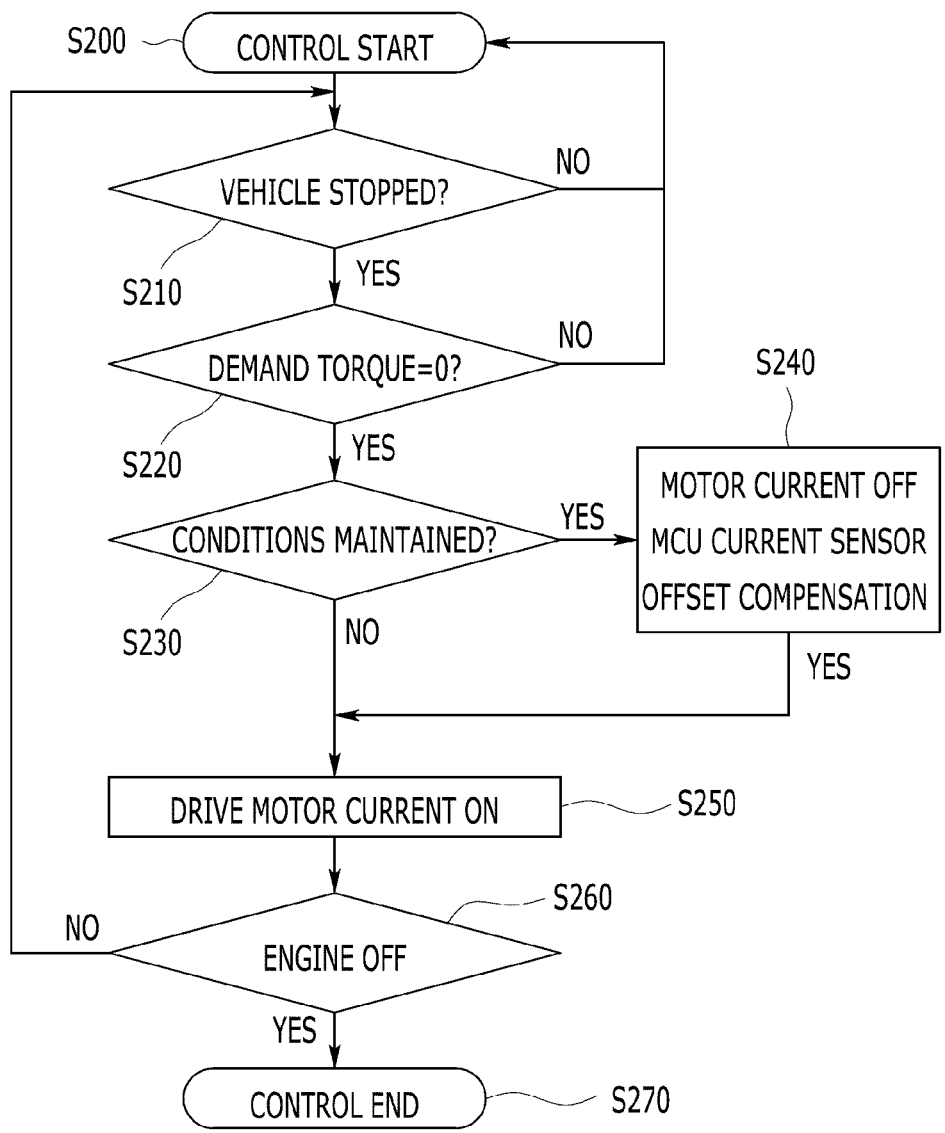
FIG. 2 is a flowchart showing a method for reconfiguring a current sensor of a vehicle having a drive motor according to an exemplary embodiment of the present invention.

FIG. 2 is a flowchart showing a method for reconfiguring a current sensor for a vehicle having a drive motor according to an exemplary embodiment of the present invention.

Referring to FIG. 2, a vehicle is turned on and control is started in step S200. Next, in step S20, it is determined whether the vehicle has stopped moving (also referred to as a "first condition"). This stop condition can be detected by a speed sensor (not shown) or any other suitable detection device.

If the first condition is met, then it is determined whether a demand torque is 0 (also referred to as a "second condition") in step S220. The demand torque can be detected by any suitable means, such as a signal of an accelerator pedal (not shown).

If the second condition is satisfied, then it is determined whether the first condition and the second condition both continue to be satisfied for a predetermined time in step S230. This can be determined by any suitable means, such as a timer (not shown), which may used in conjunction with the speed sensor and accelerator pedal (or other suitable detection means) which continue to detect whether the first and second conditions are satisfied.

If the first condition and the second condition are continued for a predetermined time in step S230, step S240 is performed, and if the first condition and the second condition are not continued, step S250 is performed.

In step S240, the operating current that is transferred to the drive motor 110 is turned off and a mode for compensating the offset of the current sensor 120 that is disposed in the motor control unit 100 is performed.

In step S240, which is carried out after step S230 when the first and second conditions are continued for a predetermined time or after step 240, the current is supplied to the drive motor 110.

Then, if the operation of the vehicle is turned off in step S260, the control ends in step S270. If the operation of the vehicle is not turned off, then the process returns to step S210.

The method by which the offset of the drive motor 110 may is compensated is known to a person of ordinary skill in the art and therefore the detailed description thereof will be omitted in an exemplary embodiment of the present invention. As such, the mode for compensating the offset of the current sensor in step S240 can be in accordance with any known method.

When the current that is supplied to the drive motor 110 is interrupted, which occurs in step S240, the vehicle control unit (VCU) 130 generates a drive motor power off instruction, and the motor control unit 100 turns off an insulated gate bipolar transistor (IGBT). Further, according to an exemplary embodiment, the current sensor 120 can be a three phase current sensor. Of course, the current sensor 120 is not necessarily limited to only a three phase type.

Thus, according to an exemplary embodiment, the reconfiguration process of the drive motor is performed so as to reconfigure the offset of the system by determining the stop condition of the vehicle (i.e. whether the vehicle is stopped or not), turning off a three phase current that is supplied to the drive motor if the vehicle is stopped, followed by setting the output voltage of the current sensor as 0 amperes.

Furthermore, the control logic (of the control portion) of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for setting a current sensor of a vehicle having a drive motor, comprising:
confirming, by a controller, whether a first condition has been met, wherein the first condition is that the vehicle stops its movement;
if the first condition is met, confirming, by the controller, whether a second condition is met, wherein the second condition is that a required torque of the drive motor of the vehicle is 0;
if the first condition and the second condition are satisfied, stopping, by the controller, a current that is supplied to the drive motor, wherein a vehicle control portion (VCU) generates a drive motor power off instruction and a drive motor control unit turns off an insulated gate bipolar transistor (IGBT) to stop the current; and
compensating, by the controller, offset of the current sensor of the drive motor control unit controlling the drive motor.

2. The method for setting a current sensor of claim 1, wherein the offset is compensated if the first condition and the second condition are satisfied for a predetermined time.

3. The method for setting a current sensor of claim 1, wherein the current sensor is a three phase type of current sensor.

4. A non-transitory computer readable medium containing program instructions executed by a processor or controller, the computer readable medium comprising:
program instructions that determine whether a vehicle stops its movement;
program instructions that determine whether a required torque of the drive motor of the vehicle is 0 when the vehicle stops its movement;
program instructions that stop a current that is supplied to the drive motor when the vehicle stops its movement and the required torque of the drive motor of the vehicle is 0, wherein a vehicle control portion (VCU) generates a drive motor power off instruction and a drive motor control unit turns off an insulated gate bipolar transistor (IGBT) to stop the current; and program instructions that control compensating offset of the current sensor of the drive motor control unit controlling the drive motor.

\* \* \* \* \*